(12) United States Patent
Hanninen et al.

(10) Patent No.: US 12,335,887 B2
(45) Date of Patent: Jun. 17, 2025

(54) CALIBRATION OF A LOW FREQUENCY OSCILLATOR USING A HIGH FREQUENCY OSCILLATOR AS A REFERENCE CLOCK

(71) Applicant: Silicon Laboratories Inc., Austin, TX (US)

(72) Inventors: Tuomas Hanninen, Helsinki (FI); Sebastien Cerdan, Montigny le Bretonneux (FR)

(73) Assignee: Silicon Laboratories Inc., Austin, TX (US)

( * ) Notice: Subject to any disclaimer, the term of this patent is extended or adjusted under 35 U.S.C. 154(b) by 334 days.

(21) Appl. No.: 17/940,483

(22) Filed: Sep. 8, 2022

(65) Prior Publication Data

US 2024/0098668 A1    Mar. 21, 2024

(51) Int. Cl.
*H04W 56/00* (2009.01)

(52) U.S. Cl.
CPC .................. *H04W 56/004* (2013.01)

(58) Field of Classification Search
CPC .................................................. H04W 56/004
See application file for complete search history.

(56) References Cited

U.S. PATENT DOCUMENTS

| | | | |
|---|---|---|---|
| 11,496,234 B2 | 11/2022 | Seethamraju | |
| 11,502,764 B2 | 11/2022 | Sarda | |
| 11,526,193 B2 | 12/2022 | Ranganathan et al. | |
| 2008/0001744 A1* | 1/2008 | Batra | G06F 1/14 340/539.22 |
| 2014/0361846 A1* | 12/2014 | Hung | H03B 5/36 331/36 C |

OTHER PUBLICATIONS

Silicon Laboratories, "EFR32BG1 Blue Gecko Bluetooth ® Smart SoC CSP Family Data Sheet," Revision 1.1, Oct. 26, 2016, 94 pages.
Silicon Laboratories, "EFM32 Series 0: Introduction to EFM32 API," downloaded from www.silabs.com/mcu on Apr. 27, 2022, 11 pages.
Silicon Laboratories, "AN0016.2: Oscillator Design Considerations," Revision 1.6, Apr. 2022, 20 pages.
Silicon Laboratories, "AN0004.1: EFM32 Series 1 and EFR32 Wireless MCU Clock Management Unit (CMU)," Revision 1.12, Mar. 2021, 39 pages.
Silicon Laboratories, "EFR32xG21 Wireless Gecko Reference Manual," Revision 0.8, Aug. 2020, 876 pages.
Silicon Laboratories, "EFR32BG22C112 Wireless Gecko SoC Data Sheet," Revision 1.1, Jun. 2021, 78 pages.

* cited by examiner

*Primary Examiner* — Jamal Javaid
(74) *Attorney, Agent, or Firm* — Zagorin Cave LLP (57) ABSTRACT

A method for operating a wireless communications device having a low energy mode of operation and a second mode of operation includes providing a first clock signal and a second clock signal in the second mode of operation. The first clock signal has a first frequency within a first frequency offset range. The second clock signal has a second frequency within a second frequency offset range. The first frequency is lower than the second frequency, and the first frequency offset range is greater than the second frequency offset range. The method includes generating a calibrated version of the first clock signal in the second mode of operation using a measurement of the first clock signal measured using a timer controlled by the second clock signal. The method includes using the calibrated version of the first clock signal in the low energy mode while the second clock signal is disabled.

20 Claims, 7 Drawing Sheets

CALIBRATION OF A LOW FREQUENCY OSCILLATOR USING A HIGH FREQUENCY OSCILLATOR AS A REFERENCE CLOCK

BACKGROUND

Field of the Invention

This disclosure relates to communications systems in general, and more particularly to communications systems using oscillator signals.

Description of the Related Art

In an exemplary short range radio frequency (RF) communications system (e.g., a system compliant with Bluetooth®, Bluetooth® Low Energy (BLE), Zigbee®, or other local area network protocol standards), a wireless communications device (e.g., a slave or peripheral device) is configured in a low-energy mode (e.g., a sleep mode) until awakened by another wireless communications device (e.g., a central or master device) to establish a connection for communications between wireless communications devices. Bluetooth Low Energy is an exemplary communications protocol designed for low power and low latency applications. A BLE device (i.e., a device compliant with the BLE standardized communications protocol) consumes substantially less power than conventional Bluetooth (i.e., Bluetooth classic) devices (i.e., devices compliant with the Bluetooth standardized communications protocol). An exemplary BLE device can start data transmission much faster than conventional Bluetooth devices. Accordingly, BLE devices can be on constantly or frequently turned on and off so they can communicate intermittently with other devices.

A connection interval is the time between two data transfer or connection events between the two wireless communications devices. During a low-energy mode (e.g., a listening window of a connection interval), a slave device maintains a connection to a master device using a low frequency reference clock signal (e.g., 32.768 kHz) that has a first target specification (e.g., up to +/−500 ppm frequency variation for a temperature range of −40 C to 85 C). In another mode of operation, (e.g., an active mode or a data transfer mode of a connection interval), the slave device uses a high frequency reference clock signal (e.g., 38-40 MHz) having a second target specification (e.g., up to +/−20 ppm frequency variation for the temperature range of −40 C to 85 C). In general, the frequency of the low frequency clock signal varies from a target frequency due to variations in process, voltage, and environmental factors. Frequency variation in the low frequency clock signal can increase the listening window and increase power consumption of the wireless communications device. Conventional systems tune the frequency of the low frequency oscillator using load capacitors, which can result in a substantial frequency offset that degrades the wireless connection or causes the wireless connection to fail. Therefore, a user may measure the offset of the low frequency oscillator to calibrate the low frequency oscillator. However, such measurements require specialized test equipment that may not be available. Accordingly, new techniques for calibrating a low frequency oscillator signal in a wireless communications device are desired.

SUMMARY OF EMBODIMENTS OF THE INVENTION

In at least one embodiment, a method for operating a wireless communications device having a low energy mode of operation and a second mode of operation includes providing a first clock signal and a second clock signal in the second mode of operation. The first clock signal has a first frequency within a first frequency offset range. The second clock signal has a second frequency within a second frequency offset range. The first frequency is lower than the second frequency, and the first frequency offset range is greater than the second frequency offset range. The method includes generating a calibrated version of the first clock signal in the second mode of operation using a measurement of the first clock signal measured using a timer controlled by the second clock signal. The method includes using the calibrated version of the first clock signal in the low energy mode of operation while the second clock signal is disabled.

In at least one embodiment, a wireless communications device includes a clock management circuit configured to provide a first clock signal while a second clock signal is disabled in a low energy mode of operation and configured to provide the first clock signal and the second clock signal in a second mode of operation. The first clock signal has a first frequency within a first frequency offset range. The second clock signal has a second frequency within a second frequency offset range. The first frequency is lower than the second frequency. The first frequency offset range is greater than the second frequency offset range. The wireless communications device includes a circuit configured in the second mode of operation to calibrate the first clock signal for frequency offset of the first clock signal using a measurement of the first clock signal measured using a timer controlled by the second clock signal.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

A clock calibration technique configures a wireless communications device to calibrate a low frequency oscillator signal having a first frequency and a first accuracy (e.g., a frequency offset in the range of +/−500 ppm) using a high frequency oscillator signal having a second frequency, which is higher than the frequency of the low frequency oscillator signal, and a second accuracy (e.g., a frequency offset in the range of +/−20 ppm), which is higher than the accuracy of the low frequency oscillator signal. The technique reduces complexity for the user and improves accuracy of the low frequency oscillator signal. Accordingly, the source of the low frequency oscillator signal can be less accurate than in a conventional system, thereby reducing component costs for a system satisfying target specifications. In an embodiment, the clock calibration technique reduces a listening window of a connection interval of a wireless communications system (e.g., a system compliant with a Bluetooth Low Energy specification), thereby allowing a slave device to spend more time in a low power mode of operation and less time listening in a higher power mode of operation (e.g., a listening mode or active mode) expecting a packet, thereby reducing power consumption of the slave device.

Figure 1:
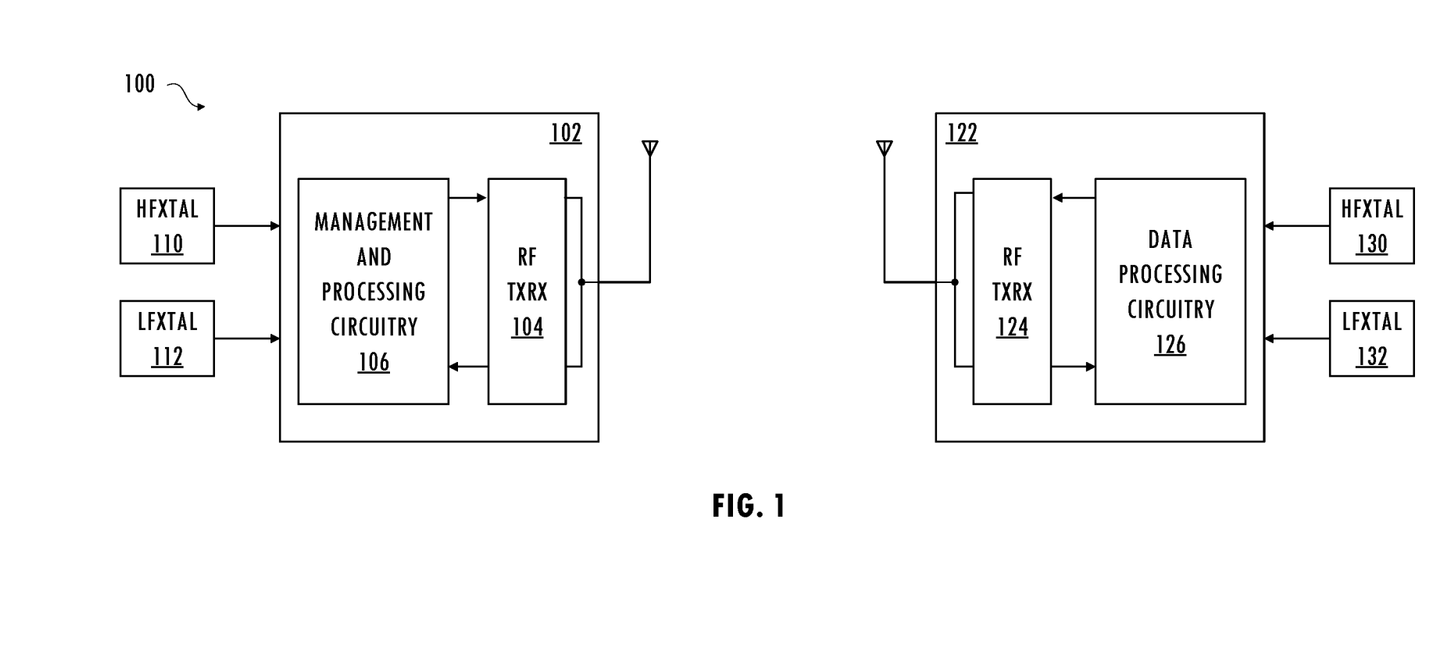
FIG. 1 illustrates a functional block diagram of a wireless communications system.

Referring to FIG. 1, in at least one embodiment, wireless communications system 100 includes wireless communications device 102, which includes radio frequency transceiver 104 and management and processing circuitry 106, and wireless communications device 122, which includes radio frequency transceiver 124 and management and processing circuitry 126. High frequency crystal 110 and low frequency crystal 112 are configured to provide periodic signals used in radio frequency transceiver functions of wireless communications device 102 and high frequency crystal 130 and low frequency crystal 132 and are used to provide periodic signals used in transceiver functions of wireless communications device 122. Although wireless communications device 102 and wireless communications device 122 are illustrated as including only one antenna each, in other embodiments of wireless communications system 100, wireless communications device 102 and wireless communications device 122 each include multiple antennas.

In at least one embodiment, wireless communications system 100 is compliant with the BLE standardized communications protocol designed for low power and low latency applications. However, in other embodiments, wireless communications system 100 is compliant with other wireless communications protocols (e.g., Bluetooth Classic, Zigbee, or other radio frequency protocol standards). In an embodiment of wireless communications system 100, to communicate with each other, wireless communications device 102 sends advertisement packets to wireless communications device 122 while wireless communications device 122 scans for advertisement packets using the same channel. Wireless communications device 122 discovers wireless communications device 102 and reads the advertisement packet and information for establishing a connection. Wireless communications device 122 sends a connection request packet, which is received by the wireless communications device 102 and triggers creation of a connection between the two wireless communications devices. In an exemplary communications sequence, receipt of a packet by wireless communications device 122 from wireless communications device 102 establishes a connection and wireless communications device 122 becomes known as a master device and wireless communications device 102 becomes known as the slave device. As the master device, wireless communications device 122 is responsible for managing the connection, controlling connection parameters, and the timing of the different events within a connection.

Figure 2:
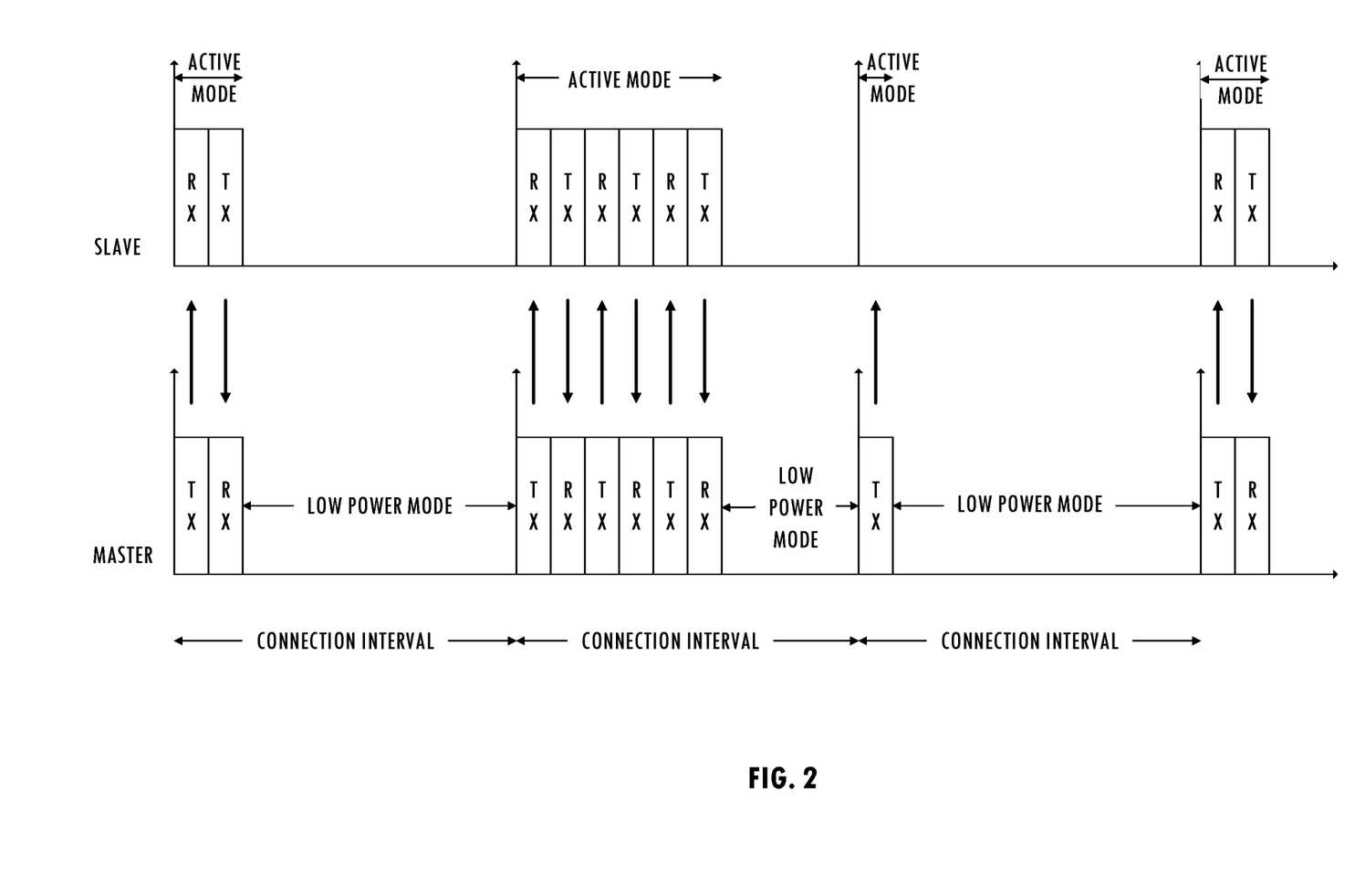
FIG. 2 illustrates exemplary communications between wireless communications devices of the wireless communications system of FIG. 1.

Referring to FIGS. 1 and 2, during an exemplary connection event, wireless communications device 122 and wireless communications device 102 alternate sending data packets to each other until neither side has data to send. A connection event includes at least one packet sent by the master device (e.g., wireless communications device 122). The slave device (e.g., wireless communications device 102) returns a packet if it received a packet from the master device. If wireless communications device 122 does not receive a packet back from wireless communications device 102, then wireless communications device 122 closes the connection event and resumes sending packets during the next connection event. When not communicating data packets, the master and the slave enter a lower power mode of operation to conserve energy. The starting points of consecutive connection events are spaced by a period called a connection interval (e.g., an interval in the range of 7.5 ms to 4000 ms).

Figure 3:
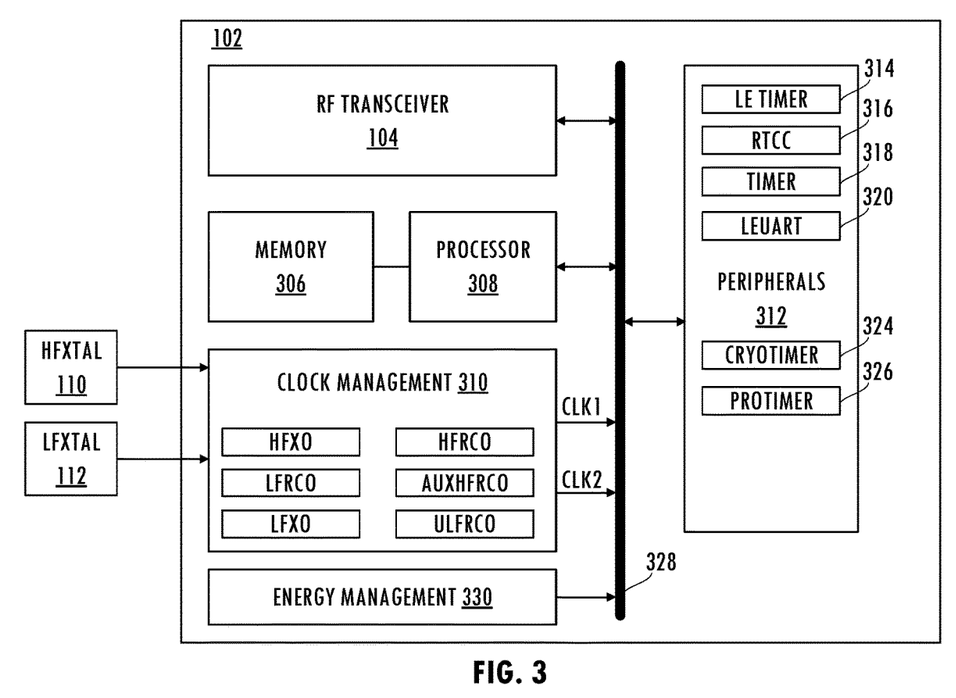
FIG. 3 illustrates a functional block diagram of an exemplary wireless communications device of the wireless communications system of FIG. 1.

Referring to FIG. 3, in at least one embodiment, wireless communications device 102 includes a radio frequency transceiver 104, processor 308, memory 306, clock management circuit 310, buses 328, and peripherals 312. Clock management circuit 310 controls enablement and configuration of oscillators and clock signals based on high frequency crystal 110, low frequency crystal 112, and internal RC oscillator circuits. In an embodiment, clock management circuit 310 individually enables or disables clock signals provided to the peripherals, e.g., based on a current energy state of wireless communications device 102. Selective enabling of oscillators and clock signals, which may be controlled by clock management circuit 310, facilitates management of system energy consumption.

In at least one embodiment of wireless communications device 102, energy management circuit 330 includes a finite state machine configured to manage the energy state of wireless communications device 102 to conserve energy. In at least one embodiment, energy management circuit 330 configures wireless communications device 102 in one of various modes of operation including an active mode in which processor 308 is operational (e.g., executing instructions stored in memory 306) and at least one low power mode in which processor 308 is not operational and that consumes less energy than the active mode (e.g., a sleep mode, a deep sleep mode, a stop mode, a hibernate mode, and a shutoff mode). For example, energy management circuit 330 configures wireless communications device 102 in an active mode, a deep sleep mode, a sleep mode, a stop mode, a hibernate mode, or a shutoff mode. In the active mode, processor 308 executes instructions retrieved from memory 306 using a high frequency clock signal or RF transceiver 104 is communicating using the high frequency clock signal. In a sleep mode, processor 308 is inactive, but RF transceiver 104 is active and communicates using a high frequency clock signal. In the deep sleep mode, processor 308 is inactive and RF transceiver 104 is inactive but wireless communications device 102 scans, advertises, or is in connection. In the stop mode, the hibernate mode, and the shutoff mode, wireless communication device 102 has no wireless communications connection. In the deep sleep mode, the stop mode, and the hibernate mode, the low frequency clock signal is active and the high frequency clock signal is inactive.

The low power modes operate using a low frequency clock signal generated based on a signal received from low frequency crystal oscillator (LFXO), low frequency RC oscillator (LFRCO), ultra-low frequency RC oscillator, or other low frequency oscillator. Required accuracy of the low frequency clock signal depends on the operating mode of wireless communications. For example, when advertising or scanning (e.g., in a deep sleep power state), accuracy is not critical to functionality. However, when a connection is open, the accuracy must be at least +/−500 ppm. This clock can be implemented either by LFXO (having higher accuracy) or PLFRCO or LFRCO (having lower accuracy) depending on the accuracy requirements. In at least one embodiment, the low frequency clock source has a frequency in the range of 32.768 kHz+/−500 ppm and is used for sleep timing. Another mode, e.g., an active mode or data transfer mode, uses a high frequency clock signal based on the high frequency crystal oscillator. For example, in the active mode of operating wireless communications device 102, energy management circuit 330 configures clock management circuit 310 to provide a high frequency clock signal (e.g., generated using HFXO or HFRCO) to enable processor 308, RF transceiver 104, or a high frequency peripheral.

In at least one embodiment, peripherals 312 communicate with each other via buses 328 independently from software executing on processor 308 and further facilitates management of system energy consumption. For example, a producer peripheral of peripherals 312 generates a signal that is routed by buses 328 to a consumer peripheral of peripherals 312. In an embodiment, each peripheral of peripherals 312 has a predetermined address range for memory-mapped access and programming.

In at least one embodiment, peripherals 312 includes various timers. For example, timer 318 is configurable to monitor timing for communications, count events, generate pulse-width modulated outputs, or trigger timed actions in other peripherals of peripherals 312. Timer 318 includes at least one multi-bit counter (e.g., 16 bits) and at least one compare and capture circuit. In an embodiment, each compare and capture circuit can be configured in a capture mode, a compare mode, or a pulse-width modulation mode. In compare mode, the compare and capture circuit stores a counter state in a buffer in response to a selected input event. In compare mode, the compare and capture circuit generates an indication of the comparison of the counter to a programmed threshold value. In the pulse-width modulation mode, the compare and capture circuit generates pulse-width modulated outputs of arbitrary waveforms defined by a sequence of values written to a compare register with optional dead-time insertion. In an embodiment, timer 318 is available only in an active mode or a sleep mode.

In at least one embodiment, real-time counter and calendar 316 is a multi-bit timer (e.g., 32-bit timer) that is available in all energy modes except shutoff. In an embodiment, real-time counter and calendar 316 is capable of providing a system wake-up signal in response to a user-defined condition. In an embodiment, real-time counter and calendar 316 provides timestamp signals, e.g., when receiving frames of data. In an embodiment, real-time counter and calendar 316 includes general-purpose storage elements. At least one of the timer peripherals can be coupled to real-time counter and calendar 316 and can be configured to start counting comparison matches from the real-time counter and calendar 316.

In an embodiment, low energy timer 314 is a multi-bit timer (e.g, 16-bit timer) available in multiple energy modes of wireless communications device 102, thereby allowing for timing and output generation and performance of simple tasks in low energy modes of operation independently from processor 308. In an embodiment, this timer is a general-purpose timer used to generate a variety of types of waveforms with negligible software activity. Low energy timer 314 is coupled to real time counter and calendar 316 and can be configured to start counting in response to an indication of a comparison from real time counter and calendar 316. Low energy timer 314 is configured to receive from clock management circuit 310 a low frequency clock signal based on a low frequency clock source, e.g., low frequency RC oscillator (LFRCO), low frequency crystal oscillator (LFXO), or ultra low frequency RC oscillator (ULFRCO) (e.g., 1 kHz). However, frequency offset of the low frequency clock source reduces accuracy of low energy timer 314.

In at least one embodiment, cryotimer 324 is an ultra-low power wake-up timer that can operate in all energy modes. Cryotimer 324 can be configured to provide periodic wakeup events and communications signals that are used to wake up other peripherals of peripherals 312 from any energy mode. In an embodiment, cryotimer 324 can be programmed to provide a wide range of interrupt periods, which facilitates flexible ultra-low energy operation.

In an embodiment, protocol timer 326 receives a high frequency clock signal, e.g., from high frequency crystal oscillator (HFXO), and is used by the RF protocol software stack executing on processor 308. Prior to energy management circuit 330 configuring wireless communication device 102 in the low power mode, software executing on processor 308 using a high frequency clock signal saves a current state of protocol timer 326. Processor 308 saves the current state of protocol timer 326 in a register and enters the sleep mode. When exiting the sleep mode and processor 308 enters an active mode, e.g., in response to a timer or other trigger, processor 308 reads the value stored in the register, calculates how many periods of a sleep clock based on the low frequency clock signal have passed, and adjusts the state of protocol timer 326 accordingly. Thus, to the RF software stack, which was dormant during the sleep state, protocol timer 326 appears to having been continually ticking. However, frequency offset of the low frequency clock source reduces accuracy of protocol timer 326 and associated radio frequency communications. Other peripherals include low-power communications transceiver (e.g., low energy universal asynchronous receiver/transmitter (LEUART) 320, which implements a serial communications interface) or other digital or analog peripheral circuits (e.g., analog-to-digital converter, digital-to-analog converter, etc.).

In an embodiment of wireless communications device 102, a default value for the period or frequency of the low frequency clock signal is stored in memory 306. In an embodiment of wireless communications device 102, an adjustment value that is determined during production is stored in a frequency adjustment field of memory 306 corresponding to the low frequency oscillator. An application programming interface (API) call reads a stored value of the period, frequency, or the frequency adjustment value from memory 306 and uses it in software routines. For example, API system_low_frequency get( ) returns a frequency value of the low frequency signal in Hz. Drivers of peripherals receiving the low frequency signal use that frequency value. An embodiment of a real time clock driver uses that frequency value to convert a delay into a number of counter increments. Manufacturing process variations, voltage variations, or environmental factors (e.g., temperature variations) can cause deviation of the actual frequency or period of a low frequency clock signal from a corresponding stored value. That deviation decreases accuracy of the low frequency clock signal and associated operations and can degrade performance and increase energy consumption of the corresponding wireless communications system.

A technique for improving the performance of a low frequency clock signal and associated operations in a wireless communications system includes using a wireless communications device to calibrate the low frequency clock signal to improve accuracy. The technique calibrates a low frequency source having a first frequency and a first frequency offset range (e.g., up to +/−500 ppm frequency offset over a temperature range of −40 C to 85 C) using a signal based on a high frequency crystal oscillator, having a higher frequency and a higher accuracy (e.g., up to +/−20 ppm frequency offset over a temperature range of −40 C to 85 C). In an embodiment, during a high energy mode of operation, the wireless communications device calculates an actual period or frequency of a low frequency clock signal, which is generated using a low frequency source, using a high frequency clock signal, which is generated using a high frequency source, and updates the stored value of the frequency, period, frequency adjustment, or combination thereof corresponding to the low frequency clock signal, accordingly, thereby calibrating the low frequency clock signal.

Figure 4:
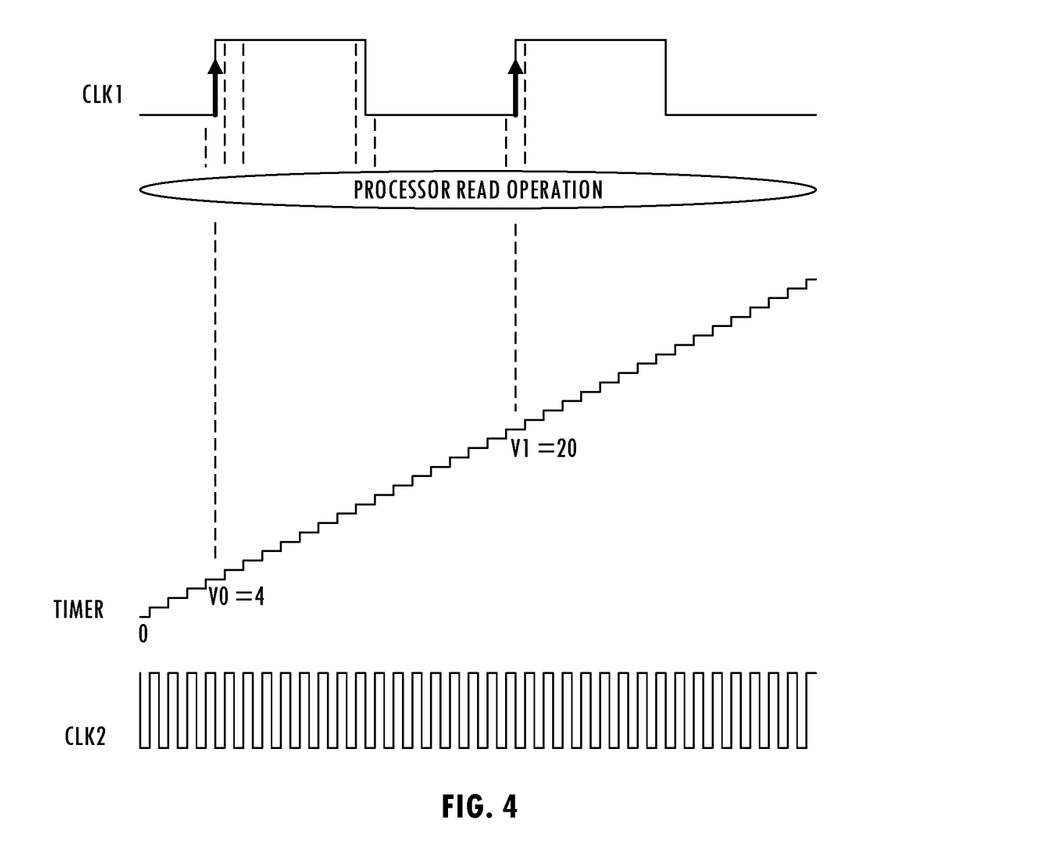
FIG. 4 illustrates waveforms for a clock calibration technique for the wireless communications device of FIG. 3 consistent with at least one embodiment of the invention.
Figure 5:
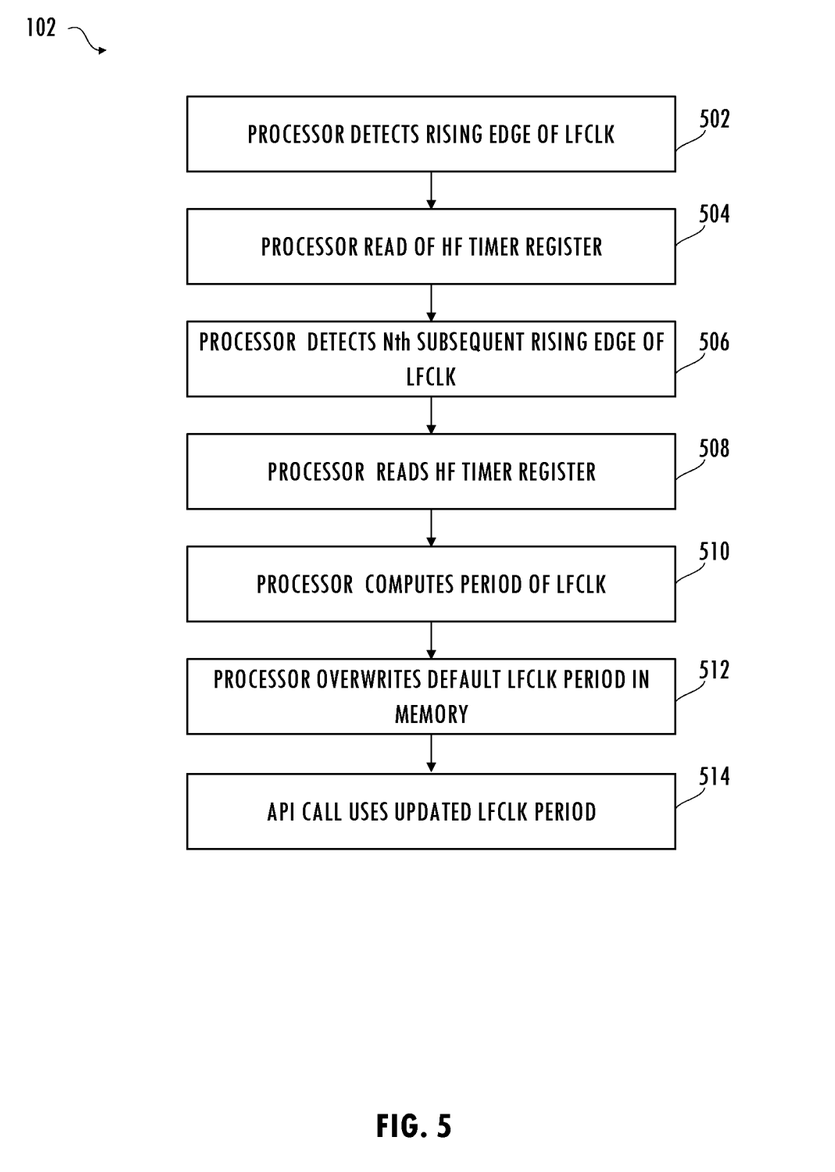
FIG. 5 illustrates an information and control flow for the clock calibration technique of FIG. 4 consistent with at least one embodiment of the invention.

Referring to FIGS. 3, 4, and 5, in at least one embodiment, wireless communications device 102 is configured in a power state in which processor 308 operates in response to a high frequency clock signal (e.g., high frequency clock signal CLK2 generated by clock management circuit 310). Processor 308, which operates using high frequency clock signal CLK2, uses high frequency clock signal CLK2 to calibrate low frequency clock signal CLK1, which is generated using a low frequency clock source. In an embodiment, processor 308 continuously reads a state of the low frequency clock signal to detect an edge of the low frequency clock signal. For example, processor 308 continuously reads a general-purpose input/output register (e.g., a general-purpose input/output register that is mapped to the internal clock signal) to detect a rising edge of low frequency clock signal CLK1 (502). If processor 308 reads the same value (e.g., '0') several times followed by reading a complementary value (e.g., '1'), then processor 308 detects an edge (e.g., a rising edge) of low frequency clock signal CLK1 and stores the value (e.g., V0=4) of a high frequency timer (e.g., protocol timer 326) in memory 306 or other storage element (504). Next, processor 308 detects a next subsequent edge or a next edge after predetermined number N of subsequent edges (e.g., the tenth rising edge) (506) and stores a corresponding value (e.g., V1=20) of the high frequency timer to memory 306 or another storage element (508). Processor 308 computes the actual period, frequency, or frequency adjustment value corresponding to the low frequency clock signal based on the stored values and predetermined value N. For example, the period is calculated as follows:

$$\text{lowFrequencyClockPeriod}=(V1-V0)/(\text{HFCF}\times N),$$

where HFCF is a value corresponding to the frequency of the high frequency clock signal stored in memory 306 (510). As predetermined number N increases, the accuracy of the computation increases. In an embodiment, processor 308 overwrites a default value of the period, frequency, or frequency adjustment corresponding to the low frequency clock signal in memory (512). A subsequent API call calibrates the low frequency clock signal by using the updated value for the period, frequency, or frequency adjustment value corresponding to the low frequency clock signal (514). As a result, a calibrated version of the low frequency clock signal is available for use by low energy timer 314 or other peripheral in a lower power state (e.g., a power state in which the high frequency clock signal is disabled). Processor 308 is configured to periodically repeat the calibration when wireless communications device 102 is configured in an active mode.

Figure 6:
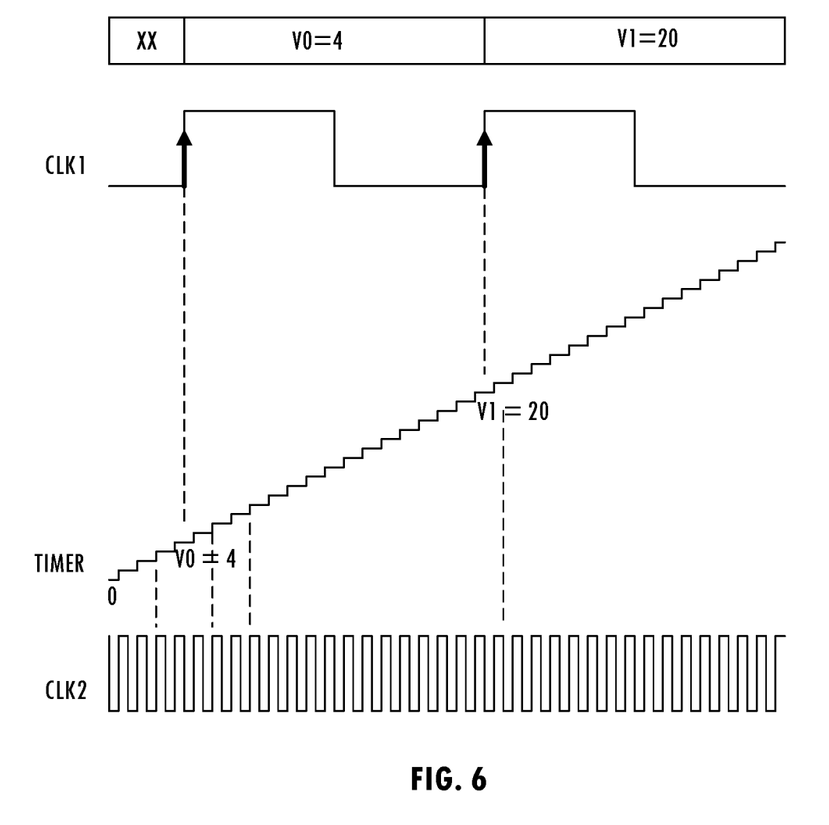
FIG. 6 illustrates waveforms for an alternate clock calibration technique for the wireless communications device of FIG. 3 consistent with at least one embodiment of the invention.
Figure 7:
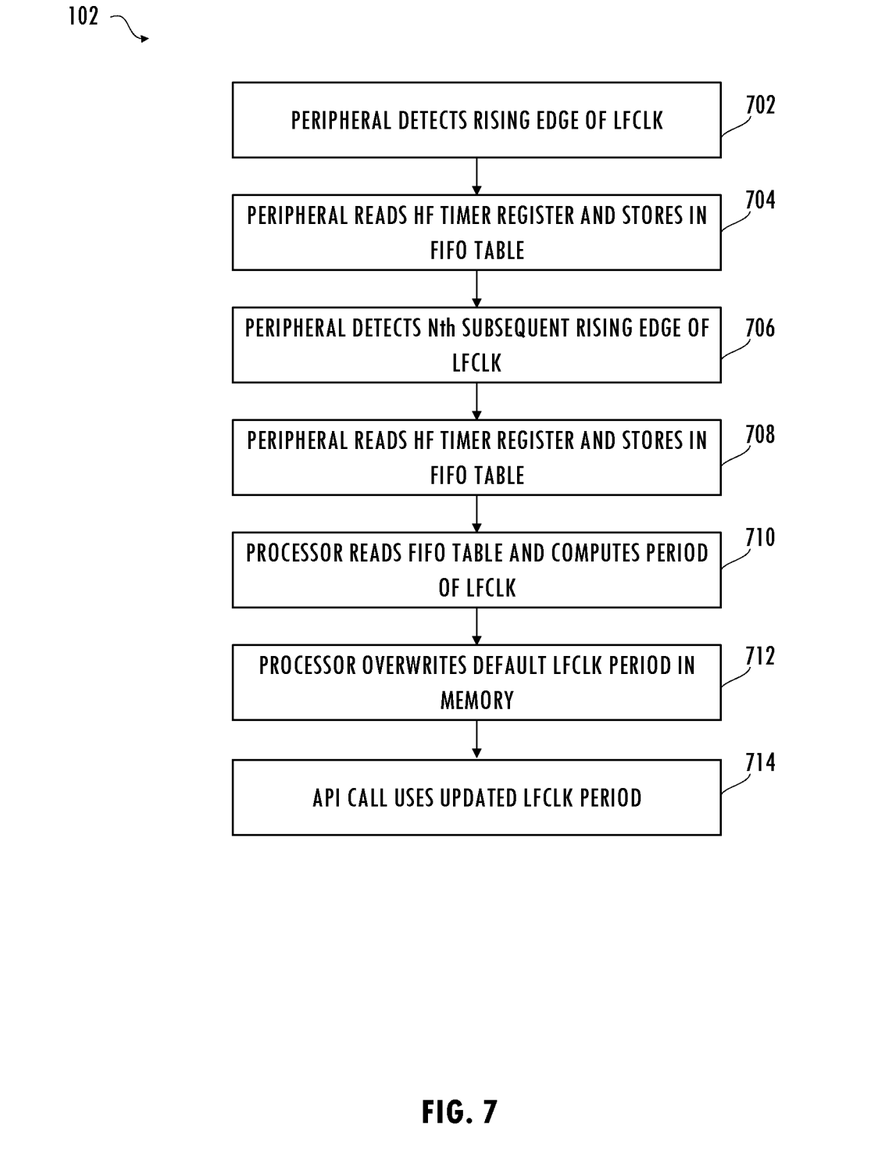
FIG. 7 illustrates an information and control flow for the clock calibration technique of FIG. 6 consistent with at least one embodiment of the invention.

Referring to FIGS. 3, 6, and 7, in at least one embodiment, wireless communications device 102 is configured in a power state in which high frequency clock signal CLK2 and processor 308 are active (e.g., an active power state). As discussed above, peripherals 312 includes enhanced functionality to perform period measurements independently from processor 308. A peripheral (e.g., timer 318) is configured to trigger capture of counter values on the rising edge, falling edge, or both edges of low frequency clock signal CLK1. The timer is configured to trigger an interrupt to the processor 308 to cause processor 308 to calculate a period, frequency, or frequency adjustment value based on newly captured counter values and to update a corresponding value stored in memory 306. A high frequency clock signal clocks a counter in the timer peripheral and an edge of the low frequency clock signal triggers capture of the counter value. The peripheral issues an interrupt to the processor 308 to initiate calculation of the period, frequency, or frequency adjustment value and update of a corresponding value stored in memory 306.

For example, timer 318 operates in the background while processor 308 executes software or is idle or in a low power mode. Timer 318 directly uses the low frequency clock signal to capture a value of an internal counter and stores that value in a first-in, first-out table in timer 318. An edge of low frequency clock signal CLK1 causes timer 318 to capture a value of an internal counter (702) and stores the value (e.g., 3) in the first-in, first-out table (704). Next, peripheral timer 318 detects a next subsequent edge or a next edge after predetermined number N of subsequent edges (e.g., twelfth rising edge) (706) and stores a corresponding value (e.g., 20) of the internal counter to the first-in, first-out table (708). In response to an interrupt from timer 318 in an active mode of operation, processor 308 reads the first-in, first out table and computes the period, frequency, or frequency adjustment value corresponding to the low frequency clock signal based on the values stored in memory 306 and predetermined value N (e.g., (12−3)/1=9, where N=1) (710). As predetermined number N increases, the accuracy of the computation increases. Processor 308 overwrites a default value of the period, frequency, or frequency adjustment value corresponding to the low frequency clock signal in memory 306 (712). A subsequent API call uses the updated value for period, frequency, or frequency adjustment value corresponding to the low frequency clock signal (714). As a result, the low frequency clock signal is calibrated and available for use by low energy timer 314 or other peripheral in a lower power state (e.g., a power state in which the high frequency clock signal is disabled). Processor 308 is configured to periodically repeat the calibration when wireless communications device 102 is configured in an active mode. Note that the information and control flows of FIGS. 5 and 7 are exemplary only and wireless communications device 102 may be configured to implement other information and control flows consistent with the teachings herein.

The techniques described above can be used to improve performance of a wireless communications system. For example, the target accuracy of protocol timer 326 depends on the operating mode of wireless communications device 102. When advertising (e.g., as a slave or a peripheral device) or scanning (e.g., as a master or a central device) in a lower frequency power state, accuracy is not a priority. However, when a connection is open, then the target accuracy is at least ±500 ppm. In an embodiment, wireless communications device 102 is configured to enter the lowest sleep mode allowed by current clock requirements. If radio transceiver 104 is not operational (e.g., wireless communications device is not in an active mode or a sleep mode), but wireless communications device 102 is in scanning, advertising or connection modes of operation, wireless communications device 102 enters a deep sleep mode of operation after synchronizing protocol timer 326. Variation in low frequency clock signal CLK1 affects accuracy of protocol timer 326, as discussed above. In at least one embodiment, wireless communications device 102 uses protocol timer 326 to synchronize its own connection timings to packets received from a master device. To save power, during a listening window, wireless communications device 102 manages the size of the window in which it listens for a packet received from a master device. The size of the listening window depends on both master frequency offset, the slave frequency offset, and the connection interval.

When using a one second connection interval and the master device has a clock with a frequency offset range of 500 ppm, then the actual packet transmitter has jitter of +/−500 µs. Since the slave device has an independent clock source, an additional error combines with the frequency error of the clock signal of the master device. For example, if the slave device has a sleep clock with 500 ppm of frequency error, then the total listening window has jitter of +/−1000p. If the receiver current is 5 mA and operates using 1.85V power supply, then the average energy that is wasted by listening window is 9.25 µJ. However, when using the same one second connection interval with a slave device having a sleep clock with 100 ppm of frequency error, then the total listening window has jitter of +/−200 µs and the average energy wasted by the listening window is 1.85 µJ. In an exemplary embodiment, for each ppm of reduction in the frequency offset of the listening window, wireless communications device 102 can spend one microsecond less time in the listening mode. Implementing the technique for periodic calibration of the low frequency clock signal against frequency offset of 40 ppm of a high frequency clock signal, obtains similar accuracy for the low frequency clock signal, which corresponds to a reduction in listening window to approximately +/−100 µs provided that both the master device and the slave device calibrate according to the techniques described above.

In another example, the techniques described above are used to reduce errors associated with the real-time counter and calendar 316, which operates using a low frequency clock signal, e.g., a signal received from low frequency crystal oscillator. Without the calibration technique described above, low frequency crystal oscillator having 200 ppm error over a target temperature range causes real-time counter and calendar 316 to have an error of approximately 100 minutes or more per year. However, if the low frequency crystal oscillator is calibrated using a high frequency crystal oscillator having approximately 20 ppm error over the target temperature range, error of low frequency crystal oscillator is reduced to approximately 30 ppm corresponding to an error of real-time counter and calendar 316 that is approximately 16 minutes per year.

Thus, techniques for calibrating a device for frequency offset in the low frequency clock source have been described. Implementation of the technique in a wireless communication system reduces a listening time of a wireless communications device thus reducing the energy consumption of a wireless communications device in an exemplary connection scenario where the connection needs to be maintained during a low power mode of operation of the wireless communications device. Structures described herein may be implemented using software executing on a processor (which includes firmware) or by a combination of software and hardware. Software, as described herein, may be encoded in at least one tangible (i.e., non-transitory) computer readable medium. As referred to herein, a tangible computer-readable medium includes at least a disk, tape, or other magnetic, optical, or electronic storage medium.

The description of the invention set forth herein is illustrative and is not intended to limit the scope of the invention as set forth in the following claims. For example, while the invention has been described in an embodiment compliant with a Bluetooth Low Energy protocol, one of skill in the art will appreciate that the teachings herein can be utilized with other integrated circuits. The terms "first," "second," "third," and so forth, as used in the claims, unless otherwise clear by context, are to distinguish between different items in the claims and do not otherwise indicate or imply any order in time, location or quality. For example, "a first received signal," and "a second received signal," do not indicate or imply that the first received signal occurs in time before the second received signal. Variations and modifications of the embodiments disclosed herein may be made based on the description set forth herein, without departing from the scope of the invention as set forth in the following claims.

What is claimed is:

1. A method for operating a wireless communications device having a low energy mode of operation and a second mode of operation, the method comprising:
providing a first clock signal and a second clock signal in the second mode of operation, the first clock signal having a first frequency within a first frequency offset range, the second clock signal having a second frequency within a second frequency offset range, the first frequency being lower than the second frequency, and the first frequency offset range being greater than the second frequency offset range;
generating a calibrated version of the first clock signal in the second mode of operation using a measurement of the first clock signal measured using a timer controlled by the second clock signal; and
using the calibrated version of the first clock signal in the low energy mode of operation while the second clock signal is disabled.

2. The method as recited in claim 1 wherein generating the calibrated version comprises:
storing a first value of the timer corresponding to a first edge of the first clock signal; and
storing a second value of the timer corresponding to a second edge of the first clock signal.

3. The method as recited in claim 2 wherein the first value of the timer and the second value of the timer are stored in memory by a processor executing instructions.

4. The method as recited in claim 2 wherein the first value of the timer and the second value of the timer are stored in memory by a peripheral independently from a processor executing instructions.

5. The method as recited in claim 2 wherein generating the calibrated version further comprises determining the measurement of the first clock signal using the first value and the second value.

6. The method as recited in claim 5 further comprising replacing a predetermined value for a frequency of the clock signal with the measurement.

7. The method as recited in claim 5 further comprising:
updating a predetermined control value based on the measurement; and
operating a peripheral application using the first clock signal and the predetermined control value.

8. The method as recited in claim 2 wherein generating the calibrated version further comprises:
detecting the first edge of the first clock signal in response to a change in a stored state of the first clock signal from a first state to a second state; and
detecting the second edge of the first clock signal in response to a second change in the stored state of the first clock signal from the first state to the second state.

9. The method as recited in claim 8,
wherein the first edge and the second edge are both rising edges or are both falling edges,
wherein the second edge occurs N periods of the first clock signal after the first edge, where Nis an integer greater than zero.

10. The method as recited in claim 1 wherein the second mode is a data transfer mode of the wireless communications device and the low energy mode is a sleep mode of the wireless communications device.

11. A wireless communications device comprising:
a clock management circuit configured to provide a first clock signal while a second clock signal is disabled in a low energy mode of operation and configured to provide the first clock signal and the second clock signal in a second mode of operation, the first clock signal having a first frequency within a first frequency offset range, the second clock signal having a second frequency within a second frequency offset range, the first frequency being lower than the second frequency, and the first frequency offset range being greater than the second frequency offset range; and
a circuit configured in the second mode of operation to calibrate the wireless communications device for frequency offset of the first clock signal using a measurement of the first clock signal measured using a timer controlled by the second clock signal.

12. The wireless communications device as recited in claim 11 further comprising:
a low-energy peripheral responsive to the first clock signal and the measurement in the low energy mode of operation; and
a high energy circuit responsive to the second clock signal in the second mode of operation.

13. The wireless communications device as recited in claim 11 further comprising:
a memory; and
a processor configured to execute instructions stored in the memory, the instructions being executable by the processor to cause the processor to determine the measurement of the first clock signal using a first value of the timer corresponding to a first edge of the first clock signal and a second value of the timer corresponding to a second edge of the first clock signal.

14. The wireless communications device as recited in claim 13
wherein the first edge and the second edge are both rising edges or are both falling edges,
wherein the second edge occurs N periods of the first clock signal after the first edge, where Nis an integer greater than zero.

15. The wireless communications device as recited in claim 13 wherein the processor is further configured to execute second instructions stored in the memory, the second instructions being executable by the processor to cause the processor to store the first value of the timer corresponding to the first edge of the first clock signal and to store the second value of the timer corresponding to the second edge of the first clock signal.

16. The wireless communications device as recited in claim 13 further comprising a peripheral configured to store the first value of the timer corresponding to the first edge of the first clock signal and to store the second value of the timer corresponding to the second edge of the first clock signal.

17. The wireless communications device as recited in claim 16 wherein the processor is further configured to execute second instructions stored in the memory, the second instructions being executable by the processor to cause the processor to update a predetermined control value based on the measurement.

18. The wireless communications device as recited in claim 13 wherein the processor is further configured to execute second instructions stored in the memory, the second instructions being executable by the processor to cause the processor to replace a predetermined period value with the measurement.

19. The wireless communications device as recited in claim 12 wherein the second mode is a data transfer mode of the wireless communications device and the low energy mode is a sleep mode of the wireless communications device.

20. An apparatus comprising:
means for providing a first clock signal and a second clock signal in a second mode of operation of a wireless communications device and for providing the first clock signal while the second clock signal is disabled in a low energy mode of operation of the wireless communications device, the first clock signal having a first frequency within a first frequency offset range, the second clock signal having a second frequency within a second frequency offset range, the first frequency being lower than the second frequency, and the first frequency offset range being greater than the second frequency offset range; and
means for calibrating the wireless communications device in the second mode of operation using a measurement of the first clock signal measured using a timer controlled by the second clock signal.

* * * * *

UNITED STATES PATENT AND TRADEMARK OFFICE
CERTIFICATE OF CORRECTION

PATENT NO. : 12,335,887 B2
APPLICATION NO. : 17/940483
DATED : June 17, 2025
INVENTOR(S) : Tuomas Hanninen and Sebastien Cerdan Page 1 of 1

It is certified that error appears in the above-identified patent and that said Letters Patent is hereby corrected as shown below:

In the Claims

Column 11, Claim 9, Line 5, please replace "Nis" to --N is--; and
Column 12, Claim 14, Line 6, please replace "Nis" to --N is--.

Signed and Sealed this
Nineteenth Day of August, 2025

Coke Morgan Stewart
*Acting Director of the United States Patent and Trademark Office*